United States Patent
Kuo et al.

(10) Patent No.: US 12,548,177 B2
(45) Date of Patent: Feb. 10, 2026

(54) METHOD FOR TRAINING DEPTH ESTIMATION MODEL, TRAINING APPARATUS, AND ELECTRONIC DEVICE APPLYING THE METHOD

(71) Applicant: HON HAI PRECISION INDUSTRY CO., LTD., New Taipei (TW)

(72) Inventors: Chin-Pin Kuo, New Taipei (TW); Tsung-Wei Liu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 290 days.

(21) Appl. No.: 18/205,424

(22) Filed: Jun. 2, 2023

(65) Prior Publication Data

US 2023/0394693 A1    Dec. 7, 2023

(30) Foreign Application Priority Data

Jun. 2, 2022   (CN) .......................... 202210624025.3

(51) Int. Cl.
*G06T 7/55* (2017.01)
*G06T 7/73* (2017.01)
(Continued)

(52) U.S. Cl.
CPC .................. *G06T 7/55* (2017.01); *G06T 7/74* (2017.01); *G06V 10/54* (2022.01); *G06V 10/761* (2022.01)

(58) Field of Classification Search
None
See application file for complete search history.

(56) References Cited

U.S. PATENT DOCUMENTS

| 2021/0312650 A1 | 10/2021 | Ye et al. |
| 2021/0398302 A1* | 12/2021 | Guizilini .................. G06T 7/50 |
| 2022/0148207 A1 | 5/2022 | Varekamp et al. |

FOREIGN PATENT DOCUMENTS

| CN | 103177451 A | 6/2013 |
| CN | 112561978 A * | 3/2021 ............... G06T 7/55 |

(Continued)

OTHER PUBLICATIONS

IEEE Transactions on Circuits and Systems for Video Technology, vol. 32, No. 4, Depth Estimation Using a Self-Supervised Network Based on Cross-Layer Feature Fusion and the Quadtree Constraint, Tian et al., Apr. 2022. (Year: 2022).*

*Primary Examiner* — David Ometz
(74) *Attorney, Agent, or Firm* — ScienBiziP, P.C.

(57) ABSTRACT

A method for training a depth estimation model comprise acquires a first image and a second image being inputted into the depth estimation model. The depth estimation model outputs a first depth image. A posture conversion relationship between the first image and the second image is extracted by a posture estimation model. A restored image is generated based on the first depth image, the posture conversion relationship, and pre-obtained camera parameters. A similarity between the restored image and the first image is calculated to obtain a two-dimension loss image. A first similarity of pixel points of each weak texture region are determined based on the two-dimension loss image. A ratio of the first similarity for adjusting the parameters of the depth estimation model is decreased and a first loss value is obtained. A training apparatus and an electronic device applying the method are also disclosed.

14 Claims, 5 Drawing Sheets

(51) Int. Cl.
  *G06V 10/54* (2022.01)
  *G06V 10/74* (2022.01)

(56) References Cited

FOREIGN PATENT DOCUMENTS

| | | |
|---|---|---|
| CN | 112819875 A | 5/2021 |
| TW | 202101374 A | 1/2021 |

* cited by examiner

METHOD FOR TRAINING DEPTH ESTIMATION MODEL, TRAINING APPARATUS, AND ELECTRONIC DEVICE APPLYING THE METHOD

FIELD

The subject matter herein generally relates to computer visual technology.

BACKGROUND

In a depth learning method of monocular depth estimation, due to a structure form motion principle, images under different time and viewing angles are provided to a model for estimating a depth value of a target frame and reconstructing an image of the target frame by a reference frame to obtain a reconstructed frame. The reconstructed frame estimated with a depth with a lower error will be closer to the target frame. A similarity of the reconstructed frame is unable to express an error degree of the depth in some scenario, for example, a low texture image is able to reconstruct an image closed to the target frame due to a large error degree, thus an error target depth estimation is learned by a network.

There is room for improvement in the art.

BRIEF DESCRIPTION OF THE DRAWINGS

Implementations of the present disclosure will now be described, by way of example only, with reference to the attached figures.

DETAILED DESCRIPTION

Figure 1:
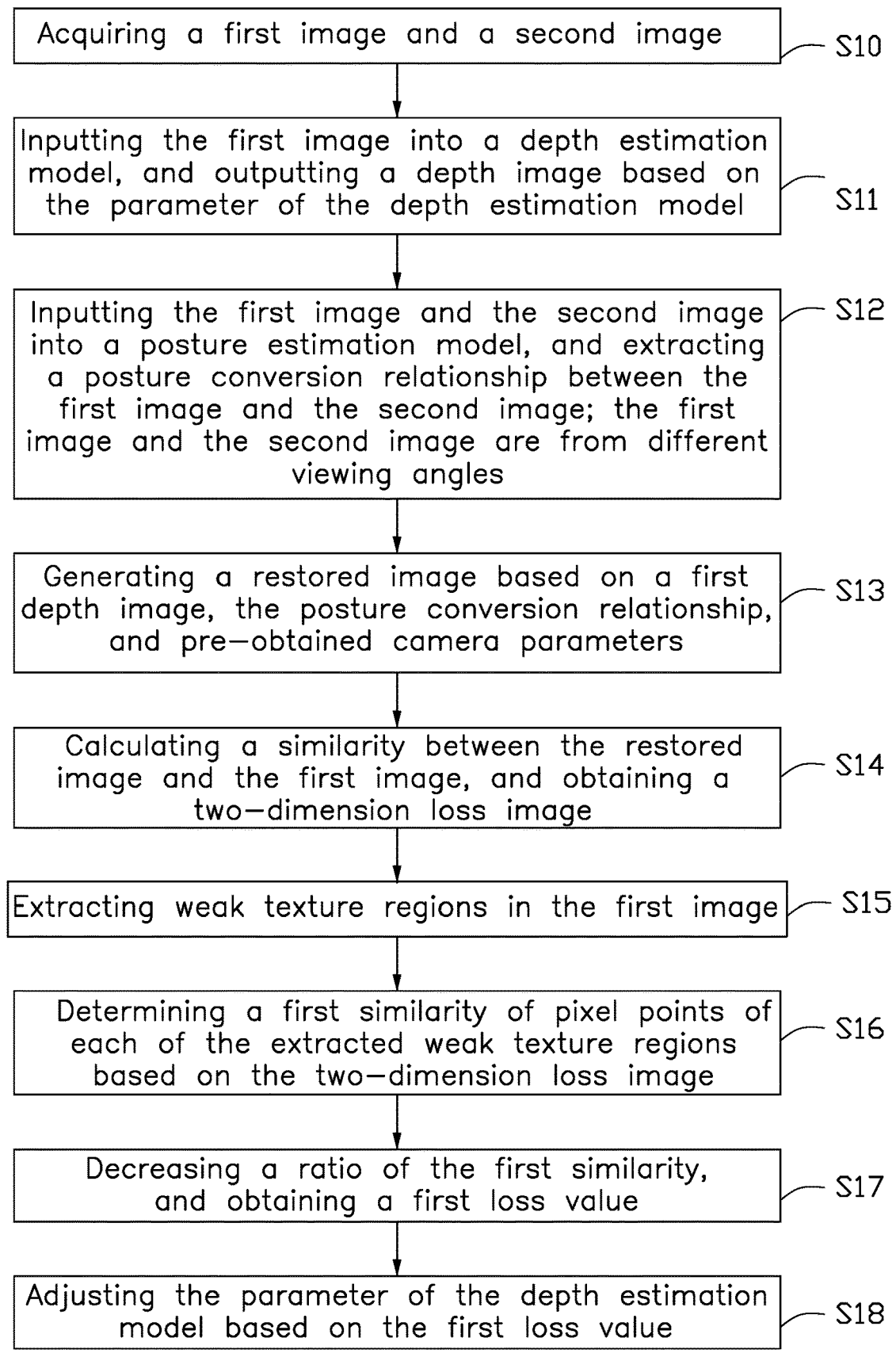
FIG. 1 is a flowchart illustrating a first embodiment of a method for training a depth estimation model according to the present disclosure.

The present disclosure is described with reference to accompanying drawings and the embodiments. It will be understood that the specific embodiments described herein are merely part of all embodiments, not all the embodiments. Based on the embodiments of the present disclosure, it is understandable to a person skilled in the art, any other embodiments obtained by persons skilled in the art without creative effort shall all fall into the scope of the present disclosure. It will be understood that the specific embodiments described herein are merely some embodiments and not all.

It will be understood that, even though the flowchart shows a specific order, an order different from the specific order shown in the flowchart can be implemented. The method of the present disclosure can include one or more steps or actions for achieving the method. The steps or the actions in the method can be interchanged with one another without departing from the scope of the claims herein.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

Before embodiments of the present disclosure are described in detail, application scenarios in embodiments of this application are described firstly.

Depth information of an image is an important information for supporting computer visual technology, which has a significant meaning for 3-dimension reconstruction, which can be applied in fields of autonomous vehicle driving, scenario understanding, robotics, 3-dimension reconstruction, photography, intelligence medical, intelligence human-computer, spatial mapping, augmented reality. For example, in the field of autonomous vehicle driving, the depth information of the image can assist in sensor fusion and drivable space detection and navigation.

The method for training a depth estimation model, a training apparatus, and an electronic device of the present disclosure are described with reference to accompanying drawings.

FIG. 1 shows a flowchart of the method for training the depth estimation model. It should be note that, the execution entity of the method for training the depth estimation model may be a training apparatus, which can be a hardware device or a software device in a hardware device, and the like. The hardware device may be a terminal device or a server, and the like. As shown in FIG. 1, the method includes the following steps and these steps may be re-ordered.

In block S10, a first image and a second image are acquired.

In one embodiment, the depth estimation model acquires training image data. The training image data includes the first image and the second image. The first image and the second image are images of a same target object in difference viewing angles. For example, the first image can be an image in a front view, and the second image can be an image in a non-front view. The target object may be a person, an animal, a vehicle, or a building, and the like.

In one embodiment, the first image and the second image may be captured by a monocular camera or a binocular stereo camera. In some embodiments, the first image and the second images may be frames extracted from a video captured by the monocular camera or the binocular stereo camera. In some embodiments, the training apparatus may store the training image data in various data storage repositories. For example, the monocular images may be stored in a monocular image storage repository, and the stereo images may be stored in a stereo image storage repository.

In block S11, the first image is inputted into the depth estimation model and a first depth image is outputted based on parameters of the depth estimation model.

In one embodiment, while the first image is inputted into the depth estimation model, the depth estimation model outputs the first depth image corresponding to the first image. A pixel value (or gray value) of each pixel point in the first depth image may represent a relative depth or a depth value. The relative depth may be a sequential logic relationship of each pixel point. A distance between an actual object corresponding to the pixel point and a photographing device or a reference plane severs as the depth value of the pixel point, which is a perpendicular distance between the pixel point of the actual object and the photographing device.

The depth estimation model may be an autoencoder (AE) network.

The AE is a kind of artificial neural networks (ANNS) used in semi supervised learning and unsupervised learning, and its function is to represent and learn the input information by taking the input information as the learning goal. An AE includes an encoder and a decoder. According to learning paradigm, AEs may be divided into an undercomplete AE, a regularized AE, and a variational AE. The undercomplete AE and the regularized AE are discriminative models, and the variational AE is a generation model. According to construction type, the AE may be a neural network of a feedforward structure or a recursive structure.

In some embodiments, the depth estimation model includes a depth encoder and a depth decoder. The depth estimation model feeds the first image through the depth encoder to extract abstract depth features. The depth encoder can extract these features using different machine learning algorithms and techniques.

For example, the depth encoder is a convolutional neural network including multiple layers where each subsequent layer reduces dimensionality of features extracted. For example, an input image on the order of 10^6 pixels or data points is reduced to a set of features on the order of 10^5 after the first layer. By the final layer in the depth encoder, the abstract depth features could be on the order of 10^4 or smaller. These numbers are provided purely for illustrative purposes. In practice, the depth encoder may have different numbers of layers and the number of pixels and depth features may vary.

In an inverse fashion, the depth decoder includes multiple layers to increase dimensionality of abstract features.

Following the example above, the depth decoder can take the abstract depth features on the order of 10^4 and gradually—over multiple layers—deduce depth (relative depth or depth value) at each pixel of the input image. The depth decoder then outputs a first depth map wherein each pixel on the depth map corresponds to a distance of the nearest object in the scene that projects to that pixel.

In some embodiments, the depth decoder outputs a disparity map wherein each pixel on the disparity map corresponds to an inverse of the distance. In one embodiment, principles described in reference to depth maps readily apply in implementations with disparity maps. For example, the input image has captured a tree some unknown distance from the camera at a given pixel. The depth decoder outputs a depth value corresponding to a distance from the camera to the block at that pixel.

In some embodiments, the output depth values can be relative to another or intrinsically defined. In other embodiments, the output depth values are up to scale providing real measurements of objects in the scene, e.g., a block is 10 feet away or a building is 25 meters away.

In block S12, the first image and the second image are inputted into a posture estimation model, and a posture conversion relationship between the first image and the second image is extracted. The first image and the second image are images from different viewing angles.

In one embodiment, the posture estimation model receives a plurality of concatenated input images (such as the first image and the second image) to determine a posture for each of the input images. Posture generally refers to a mathematical transformation between perspectives of two images. In some embodiments, the posture more generally describes a perspective of an image wherein the perspectives can be used to define the transformation between two images.

In one embodiment, the posture estimation model may include a posture encoder and a posture decoder. By inputting the first image and the second image into the posture encoder, the posture encoder extracts abstract posture features from the first image and the second image. The abstract posture features are then input through the posture decoder which determines a posture conversion relationship between the first image and the second image. The posture encoder may be configured as a convolutional neural network including multiple layers for extracting the abstract posture features and then deducing the posture for each of the first image and the second image.

In block S13, a restored image is generated based on the first depth image, the posture conversion relationship, and pre-obtained camera parameters.

In one embodiment, after acquiring the first depth image, the restored image is generated based on the depth value of each pixel point in the first depth image, the posture conversion relationship between the first image and the second image, and the pre-obtained camera parameters.

In detail, the depth value of each pixel point in the first depth image, the camera parameters, the posture conversion relationship, and the position coordinates of each pixel point in the first depth image serve as an input of a position conversion algorithm, for outputting corresponding position coordinates of each pixel point in the restored image. A pixel value of each pixel point in the first depth image is determined, and the restored image is generated based on the pixel values and the position coordinates.

In detail, a formula (1) of the position conversion algorithm is shown as below. The depth value of each pixel point in the first depth image, the camera parameters, the posture conversion relationship, and the position coordinates of each pixel point in the first depth image are inputted into the formula (1) for obtaining corresponding position coordinates of each pixel point in the restored image.

$$B_2 = KTD_1K^{-1}B_1 \quad \text{Formular (1)}$$

$B_1$ is a position of a pixel point in the first image, by representing with (x1, y1). $B_2$ is a position of a pixel point in the restored image, by representing with (x2, y2). K is a matrix composed by the camera parameters. T is the posture conversion relationship. A number of columns in K is equal to a number of rows in T.

Figure 2:
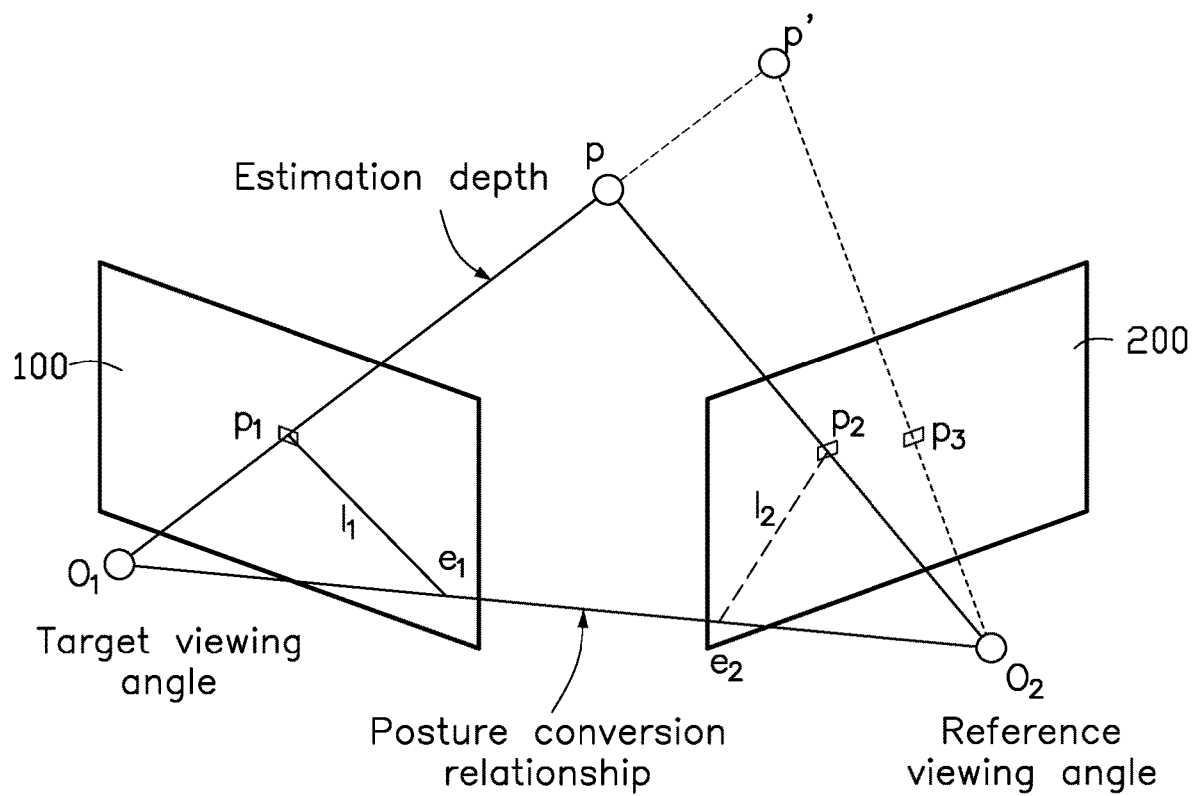
FIG. 2 is a schematic diagram illustrating an embodiment of forming a restored image according to the present disclosure.

FIG. 2 shows a schematic diagram of the generated restored image.

As shown in FIG. 2, the first image 100 is an image of a target point P captured under a target viewing angle $O_1$, the target point P is at the position P1 in the first image 100. The second image 200 is an image of a target point P captured under a reference viewing angle $O_2$, the target point P is at the position P2 in the second image 200. Under a restoring process overview, the pixels under the reference viewing angle $O_2$ are re-mapped to positions of the pixels under the target viewing angle $O_1$ for restoring the restored image under the target viewing angle $O_1$. Due to a principle of mapping, the pixel P1 under the target viewing angle $O_1$ corresponds to a only pixel P2 under the reference viewing angle $O_2$, due to the corrected depth value corresponding to the target point P in 3D coordinates. Due to a calculation of mapping, based on a position of any pixel P1 for calculating the position of the pixel P2, the position of the target point P in a coordinate system of the target viewing angle $O_1$ is calculated by the estimated depth and the parameter K in the camera, which is the position of the pixel P1. The position of the target point P in a coordinate system of the reference viewing angle $O_2$ is obtained by the posture conversion relationship, which is the position of the pixel P2. The corresponding mapped pixel point may be calculated based on the position of the target point P in the coordinate system of the reference viewing angle $O_2$ and the parameter K in the camera. After calculating all the pixels P2 corresponding to the pixels P1 in the first image, the restored image is obtained by replacing the color of the pixels P1 with the color of the corresponding pixels P2.

In block S14, a similarity between the restored image and the first image is calculated, a two-dimension loss image is obtained.

In one embodiment, the restored image and the first image are two-dimension image in a same size. By calculating the similarity between the restored image and the first image, which is the degree of the similarity between the restored image and the first image, the similarity value is obtained.

In some embodiments, a similarity function may be implemented as a difference of color between two pixels of the restored image and the first image corresponding to a same target point. For example, the first image and the restored image are RGB images. The target point P corresponds to the pixel point P3 in the restored image, and a color vector of the pixel point P3 is (r3, g3, b3). The target point P corresponds to the pixel point P1 in the first image, and a color vector of the pixel point P1 is (r1, g1, b1). The difference of the color vector between the pixel point P3 and the pixel point P1 is calculated. For example, the similarity between the two pixels is computed, according to the formular of $|r1-r3|+|g1-g3|+|b1-b3|$. The similarity between the two pixels is computed, according to the formular of $\sqrt{(r1-r3)^2+(g1-g3)^2+(b1-b3)^2}$.

In other embodiments, the similarity function may be implemented as a structural similarity (SSIM) of the restored image and the first image. For example, a difference between windows at a same position in the restored image and the first image. The window defines a position of a specified center pixel and includes a set of pixels surrounding the specified center pixel in a N*N region.

In one embodiment, the two-dimension loss image is calculated based on the similarity, which is a single channel image. The pixel value of the two-dimension loss image is the similarity value between the two pixels (or two windows) at the same position.

In one embodiment, the restored image is an image obtained by calculating a mapping relationship according the first depth image and the posture conversion relationship and pasting the color of the second image under the target viewing angle. In ideal condition (with lower error in depth and posture), the restored image is the same as the first image. If a larger depth error is estimated by the depth estimation model, and the restored image is close to the first image, thus an error target depth estimation is learned by the depth estimation model.

As shown in FIG. 2, if the estimation depth of the pixel P1 estimated by the depth estimation model is large, a pixel point P' is calculated. According to a mapping process, the pixel point P3 is calculated based on the pixel point P', and the restored image with error is obtained. Actually, due to the pixel point P2 and the pixel point P3 under a larger error, if the texture of the pixel point P2 and the pixel point P3 are similar to each other, it is unable to represent a position error between the pixel point P and the pixel point P'. Therefore, based on the image with weak texture regions, the restored image is close to the original image under a large depth error, and the error target depth estimation is learned by a network.

Therefore, by decreasing the ratio of the loss value of the weak texture regions, a ratio of the loss value of the non-weak texture regions is increased. A weight of the weak texture regions while training the depth estimation model is decreased, and a correction amplitude of misleading the depth estimation model by the weak texture regions while training is reduced. An error effect of the weak texture regions applied on learning of the depth estimation model is reduced.

In block S15, weak texture regions in the first image are extracted.

In one embodiment, the information of the color and the brightness of the first image is acquired, and the first image are dividing into region based on the information of the color and the brightness. A gradient information corresponding to the first image is calculated. Based on the gradient information, the weak texture regions are selected from the divided regions. A gradient average value of the regions is in a predetermined range as the weak texture regions.

In detail, a diving method of region, such as region growing, is applied to divide the image. The basic idea of the region growing is that a collection of pixels with similarity are gathered together to construct a region. Specifically, one seed sub-pixel is found as a growth starting point for each region needed to be segmented, then the seed sub-pixel and pixels (pixels with similar information in color and brightness) in the adjacent region which have the same or similar properties as the seed sub-pixel are incorporated into the seed sub-pixel region. The above operations are repeated, until there is no pixel satisfied with the condition being incorporated, thus the regions are divided. Due to the dividing manner based on the information in color and brightness, characteristics of the pixels in a same region are similar with each other. The image may be regarded as a two-dimensional discrete function I (i, j), (i, j), and coordinates I (i, j) of each pixel (i, j) serve as a pixel value (such as RGB value). Information of gradient is actually a derivation of the two-dimensional discrete function by a gradient derivation formula, such as Sobel, Roberts, kirsch, laplace, piewitt, robinson operator, and the like. A size of the gradient reflects a frequency change in color and brightness of the pixel in the image. For the weak texture region, the change between pixels with similar color and brightness is slightly, and the value of the gradient is small. Based on the idea, the divided regions with a small average statistical gradient are the weak texture regions.

In some embodiments, non-weak texture regions opposite with the weak texture regions, positions with great change in the color gradient are obtained, which are the regions with obvious visual features (the non-weak texture regions). The regions removing the non-weak texture regions in the first image are the weak texture regions.

In block S16, a first similarity of pixel points of each of the extracted weak texture regions is determined based on the two-dimension loss image In one embodiment, a size of the two-dimension loss image is the same as the size of the first image. Pixels in the two-dimension loss image corresponding to pixels in the first image in a one-to-one relationship. The weak texture regions in the first image correspond to the two-dimension loss image. For example, N pixel points of the weak texture regions in the first image correspond to N first similarities of the two-dimension loss image.

In block S17, a ratio of the first similarity is decreased, and a first loss value is obtained.

In one embodiment, the loss value is obtained by processing the pixel points in the two-dimension image. For example, the first loss value is obtained by weighted and summed the pixel points in the two-dimension image. The first loss value may be indicated whether the depth estimation being fully trained and/or whether the estimated depth is accurate.

In one embodiment, after determining the first similarity of each pixel point in the weak texture region, a decreased ratio of the first similarity is specified related to a hyperparameter. For example, based on the decreased ratio S, the first similarity of the two-dimension loss image are multiplied by the decreased ratio S, the pixel value of each of the N pixel points corresponding to the weak texture region in the two-dimension loss image is multiplied by the decreased ratio S, and then each pixel points in the two-dimension loss image is processed to obtain the first loss value. The decreased ratio can be set according to actual test data.

In one embodiment, the loss value provided by the weak texture regions as the above described are generally reduced. No matter whether the model learns a corrected depth estimation, there is not much difference in the loss value corresponding to the weak texture regions. If the ratio of the weak texture regions is too high, the training of the model is being affected. Thus, by decreasing the ratio of the weak texture regions, the loss values of the weak texture regions are decreased, for reducing a negative effect of the weak texture regions on training the model.

In block S18, the parameters of the depth estimation model are adjusted based on the first loss value.

In one embodiment, the parameters of the depth estimation model are adjusted based on the first loss value obtained in block S17, the first loss value is minimized while adjusting the parameters of the depth estimation model.

Figure 3:
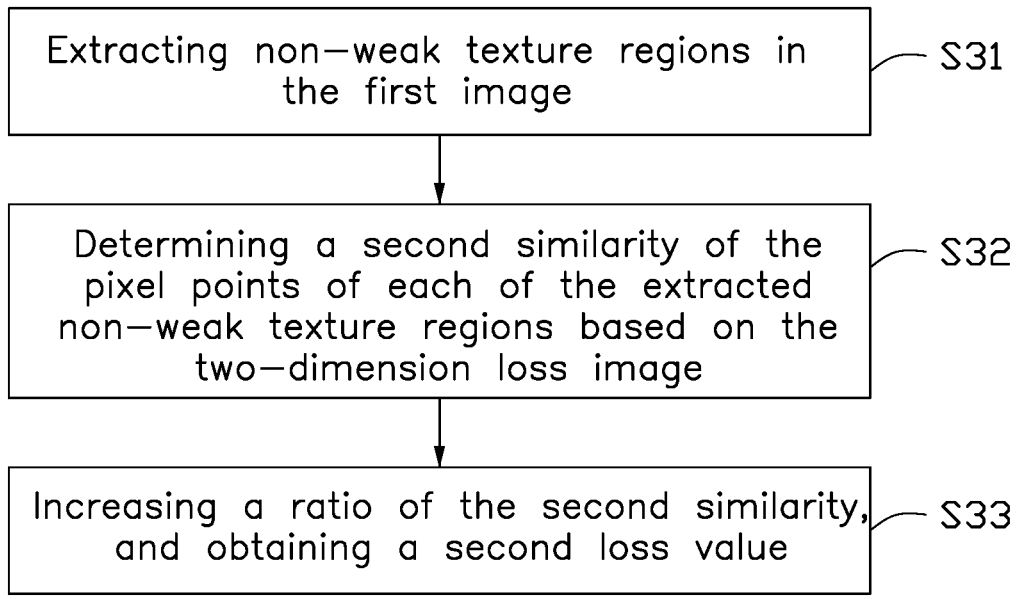
FIG. 3 is a flowchart illustrating a second embodiment of a method for training a depth estimation model according to the present disclosure.

In some embodiments, FIG. 3 shows a further step of the method for training the depth estimation model. The method further comprises the follow steps.

In block S31, non-weak texture regions in the first image are extracted.

In one embodiment, the first image includes the weak texture regions and the non-weak texture regions. Referring to the block S15, the information of the color and the brightness of the first image is acquired, and the first image are dividing into region based on the information of the color and the brightness. A gradient information corresponding to the first image is calculated. Based on the gradient information, the weak texture regions are selected from the divided regions. A gradient average value of the regions is in a predetermined range as the weak texture regions. The difference between the block S15 and the block S31 is the gradient average value of the regions is outside the predetermined range as the non-weak texture regions.

In some embodiment, positions with minor change in the color gradient are obtained, which are the regions with unobvious visual features (the weak texture regions). The regions removing the non-weak texture regions in the first image are the weak texture regions.

In some embodiments, the block S31 is executed by combining with the block S15 together, which is executed after the block S15 of extracting the weak texture regions in the first image.

In block S32, a second similarity of the pixel points of each of the non-weak texture regions based on the two-dimension loss image is determined.

In the embodiment, the size of the two-dimension loss image is equal to the first image. Each pixel points of the two-dimension loss image corresponds to each pixel points of the first image. The non-weak texture regions in the first image correspond to the two-dimension loss image. For example, M pixel points of the non-weak texture regions in the first image correspond to M second similarities of the two-dimension loss image.

In block S33, a ratio of the second similarity is increased, and a second loss value is obtained.

In one embodiment, the after calculating the second similarity of the pixel points of each non-weak texture region, the enlarged ratio of the second similarity is specified related to a hyperparameter. For example, based on the enlarged ratio Q, the second similarity of the two-dimension loss image are multiplied by the enlarged ratio Q, the pixel value of each of the M pixel points corresponding to the non-weak texture region in the two-dimension loss image is multiplied by the enlarged ratio Q, and then each pixel points in the two-dimension loss image is processed to obtain the second loss value. The enlarged ratio can be set according to actual test data.

In block S34, the parameters of the depth estimation model are adjusted based on the second loss value.

In some embodiments, the ratio of the first similarity is decreased at the time of the ratio of the second similarity are increased, the first loss value and the second loss value are obtained. The parameters of the depth estimation model are adjusted according to the first loss value and the second loss value.

In the embodiment, the loss value provided by the weak texture regions as the above described are generally reduced. No matter whether the model learns a corrected depth estimation, there is not much difference in the loss value corresponding to the weak texture regions. If the ratio of the weak texture regions is too high, the training of the model is being affected. Thus, non-weak texture regions are found by a manner of searching the pixel points of the non-weak texture regions, the ratio of the loss value of the non-weak texture regions are increased, an effect of the weak texture regions to the training of the model is reduced.

Figure 4:
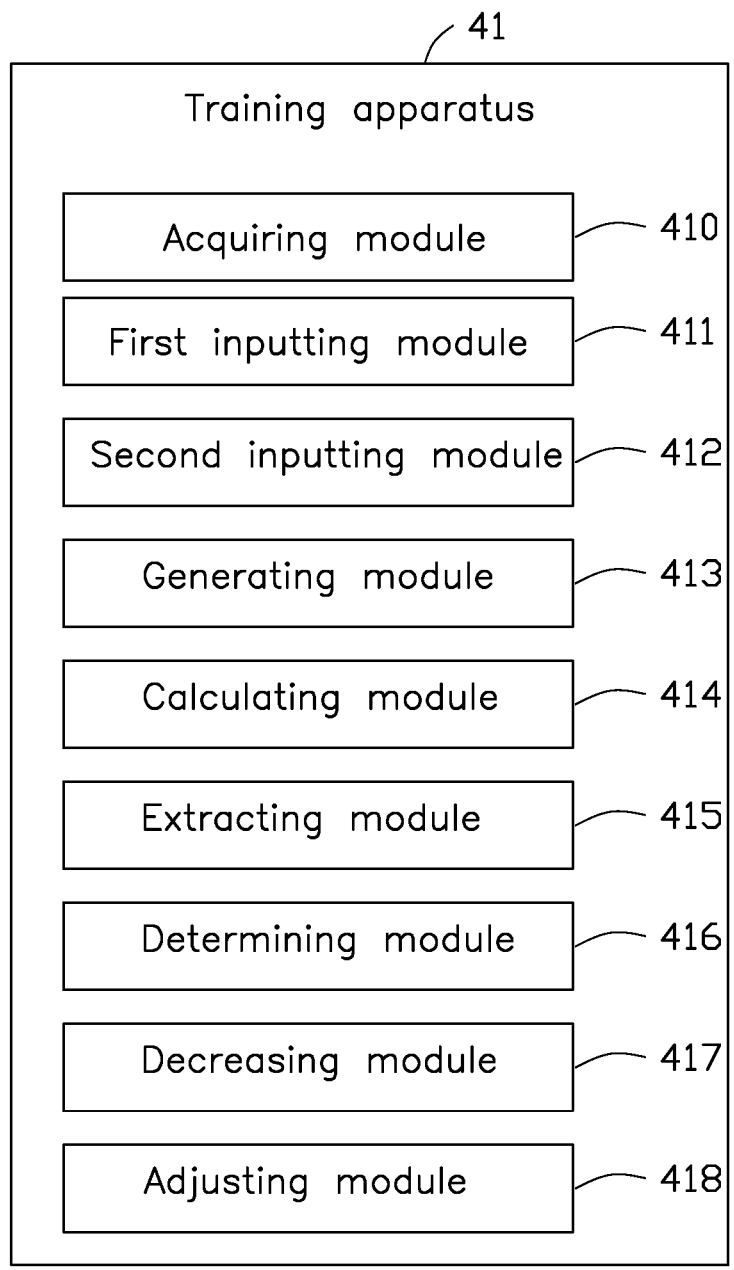
FIG. 4 is a diagram illustrating an embodiment of a training apparatus according to the present disclosure.

FIG. 4 is a diagram of a training apparatus 41 of the present disclosure.

In the embodiment, the training apparatus 41 includes an acquiring module 410, a first inputting module 411, a second inputting module 412, a generating module 413, a calculating module 414, a extracting module 415, a determining module 416, a decreasing module 417, and a adjusting module 418.

The acquiring module 410 is configured to acquire a first image and a second image.

The first inputting module 411 is configured to input the first image and the second image into a depth estimation model, and output a first depth image based on parameters of the depth estimation model.

The second inputting module 412 is configured to input the first image and the second image into a posture estimation model, and extract a posture conversion relationship between the first image and the second image. The first image and the second image are images from different viewing angles.

The generating module 413 is configured to generate a restored image based on the first depth image, the posture conversion relationship, and pre-obtained camera parameters.

The calculating module 414 is configured to calculate a similarity between the restored image and the first image, and obtain a two-dimension loss image.

The extracting module 415 is configured to extract weak texture regions in the first image.

The determining module 416 is configured to determine a first similarity of pixel points of each of the extracted weak texture regions based on the two-dimension loss image.

The decreasing module 417 is configured to decrease a ratio of the first similarity, and obtain a first loss value.

The adjusting module 418 is configured to adjust the parameters of the depth estimation model based on the first loss value.

Figure 5:
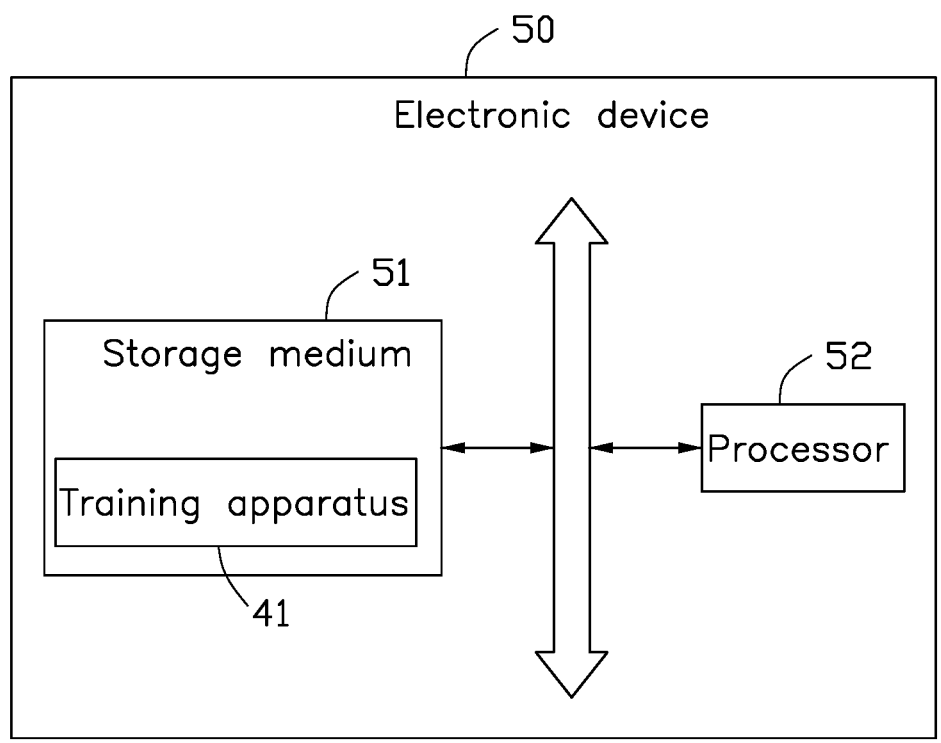
FIG. 5 is a diagram illustrating an embodiment of an electronic device according to the present disclosure.

FIG. 5 shows a structure of an electronic device 50. In the embodiment, the electronic device 50 includes a storage medium 51 and at least one processor 52. Those skilled in the art will understand that a structure of the electronic device 50 as shown in FIG. 5 is only an example and does not constitute a limitation on the electronic device 50. The structure of the electronic device 50 may be a bus structure, or may be a star structure, and may further include more or fewer components than those shown in FIG. 5, or combine some components, or have different component arrangements.

In some embodiments, the electronic device 50 can automatically perform numerical value computation and information processing based on a pre-set or pre-stored instruction, whose hardware may include, but is not limited to, a microprocessor, an application-specific integrated circuit (ASIC), a programmable gate array (FPGA), a digital processor (DSP), an embedded device, and the like.

It should be noted that, the electronic device 50 is only an example, and other electronic devices, whether existing or yet to be developed, if applicable to the present invention, should also be included within the protection scope of the present invention.

In some embodiments, the storage medium 51 is configured to store program code and various data, for example, program code of the training apparatus 41 installed on the electronic apparatus 50, and implement high-speed and automatic access of the program or data during operation of the electronic apparatus 50. The storage medium 51 can be a read-only memory (ROM), Programmable Read-Only Memory (PROM), Erasable Programmable Read-Only Memory, (EPROM), One-time Programmable Read-Only Memory (OTPROM), Electrically-Erasable Programmable Read-Only Memory (EEPROM), Compact. Disc Read-Only Memory (CD-ROM) or other optical disc memories, optical disc memories (including a compact disc, a laser disc, an optical disc, a digital versatile disc, a BLU-RAY disc, and the like), a magnetic disk storage medium or other magnetic storage devices, or any other medium which can be used for carrying or storing expected program code in an instruction or data structure form and can be accessed by a computer, not being limited thereto.

In some embodiments, the at least one processor 52 may include a single packaged integrated circuit, or may include a plurality of packaged integrated circuits having the same function or different functions. For example, the processor 50 may include one or more central processing units (CPUs), microprocessors, digital signal processors (DSPs), graphic processing units (GPUs), or a combination thereof. The at least one processor 52 is a control center of the electronic device 50 and connects various parts of the entire electronic device 50 by using various interfaces and lines. The at least one processor 52 performs various functions and processes data of the electronic device 50 by running or executing programs or units stored in the storage medium 51 and invoking data stored in the storage medium 51, for example, performing a function of training the depth estimation model.

It should be understood that, the foregoing descriptions are merely specific implementation manners of the present disclosure, but are not intended to limit the protection scope of the present embodiments.

The above described integrated units implemented in a form of software function modules can be stored in a computer readable storage medium. The software function modules as described above are stored in a storage medium, and the software function modules include instructions for causing a computer device (e.g., the computer device can be a personal computer or a server, etc.) or a processor to perform partial steps of methods in various embodiments of the present disclosure.

In a further embodiment, combined with FIG. 1, the at least one processor 52 may execute operation apparatus of the electronic device 50, various installed application programs, and program code, and the like, for example, the above modules.

The storage medium 51 stores program codes, and the at least one processor 52 may invoke the program code stored in the storage medium 51 to implement functions. For example, the modules in FIG. 4 are program code stored in the storage medium 51, and are executed by the processor 52 to implement the functions of the modules for achieving a purpose of training the depth estimation model.

In one embodiment of the present disclosure, the storage medium 51 stores one or more instructions (at least one instruction), being executed by the at least one processor 52 to implement a purpose of training the depth estimation model as shown FIG. 1.

In several embodiments provided in the present application, it should be understood that the disclosed device and method may be implemented in other ways. For example, the division of modules or sub-modules is merely a logic function division, and other division manners may exist in actual implementation.

The units that are described as separate components can be physically separated or not physically separated, and the components displayed as units can be physical units or not physical units. That is, the units or components can be located at one place or scattered on several network units. A part or all of the modules may be selected according to actual needs to achieve the objectives of the solutions of the embodiments.

What is claimed is:

1. A method for training a depth estimation model, being applicable in an electronic device; the electronic device comprises a storage medium with computer programs and a processor; the processor executes the computer programs to implement the following steps:
   acquiring a first image and a second image, the first image and the second image being images viewed from different viewing angles;

inputting the first image and the second image into the depth estimation model, and outputting a first depth image based on parameters of the depth estimation model;
inputting the first image and the second image into a posture estimation model, and extracting a posture conversion relationship between the first image and the second image;
generating a restored image based on the first depth image, the posture conversion relationship, and pre-obtained camera parameters;
calculating a similarity between the restored image and the first image, and obtaining a two-dimension loss image;
extracting weak texture regions in the first image;
determining a first similarity of pixel points of each of the weak texture regions based on the two-dimension loss image;
decreasing a ratio of the first similarity, and obtaining a first loss value; and
adjusting the parameters of the depth estimation model based on the first loss value.

2. The method of claim 1, wherein the method further comprises:
extracting non-weak texture regions in the first image;
determining a second similarity of pixel points of each of the extracted non-weak texture regions based on the two-dimension loss image;
increasing a ratio of the second similarity, and obtaining a second loss value; and
further adjusting the parameters of the depth estimation model based on the second loss value.

3. The method of claim 2, wherein the steps of increasing a ratio of the second similarity, and obtaining a second loss value comprises:
acquiring an enlarged scale of the second similarity; and
adjusting the second similarity based on the enlarged scale, and obtaining the second loss value.

4. The method of claim 2, wherein the step of extracting non-weak texture regions in the first image comprises:
acquiring information of color and brightness of the first image;
dividing the first image into regions based on the information of color and brightness;
calculating gradient information of the first image; and
selecting the regions based on the gradient information, wherein a gradient average value of the regions is outside a predetermined range, as the non-weak texture regions.

5. The method of claim 2, wherein the non-weak texture regions comprise regions of object edges.

6. The method of claim 1, wherein the steps of decreasing a ratio of the first similarity, and obtaining a first loss value comprises:
acquiring a reduced scale of the first similarity; and
adjusting the first similarity based on the reduced scale, and obtaining the first loss value.

7. The method of claim 1, wherein the step of extracting weak texture regions in the first image comprises:
acquiring information of color and brightness of the first image;
dividing the first image into regions based on the information of color and brightness;
calculating gradient information of the first image; and
selecting the regions based on the gradient information, wherein a gradient average value of the regions is in a predetermined range, as the weak texture regions.

8. A training apparatus comprises a storage medium and at least one processor; the storage medium stores at least one command; the at least one commands is implemented by the at least one processor to execute functions; the storage medium comprising:
an acquiring module, configured to acquire a first image and a second image; the first image and the second image are images from different viewing angles;
a first inputting module, configured to input the first image and the second image into a depth estimation model, and output a first depth image based on parameters of the depth estimation model;
a second inputting module, configured to input the first image and the second image into a posture estimation model, and extract a posture conversion relationship between the first image and the second image;
a generating module, configured to generate a restored image based on the first depth image, the posture conversion relationship, and pre-obtained camera parameters;
a calculating module, configured to calculate a similarity between the restored image and the first image, and obtain a two-dimension loss image
a extracting module, configured to extract weak texture regions in the first image;
a determining module, configured to determine a first similarity of pixel points of each of the extracted weak texture regions based on the two-dimension loss image;
a decreasing module, configured to decrease a ratio of the first similarity, and obtain a first loss value; and
a adjusting module, configured to adjust the parameters of the depth estimation model based on the first loss value.

9. An electronic device comprises:
a storage medium; and
a processor,
wherein the storage medium stores computer programs, and
the processor executes the computer programs to implement the following steps:
acquiring a first image and a second image; the first image and the second image are images from different viewing angles;
inputting the first image and the second image into the depth estimation model, and outputting a first depth image based on parameters of the depth estimation model;
inputting the first image and the second image into a posture estimation model, and extracting a posture conversion relationship between the first image and the second image;
generating a restored image based on the first depth image, the posture conversion relationship, and pre-obtained camera parameters;
calculating a similarity between the restored image and the first image, and obtaining a two-dimension loss image;
extracting weak texture regions in the first image;
determining a first similarity of pixel points of each of the extracted weak texture regions based on the two-dimension loss image;
decreasing a ratio of the first similarity, and obtaining a first loss value; and
adjusting the parameters of the depth estimation model based on the first loss value.

10. The electronic device of claim 9, wherein the processor further executes the computer programs to implement:
extracting non-weak texture regions in the first image;

determining a second similarity of pixel points of each of the extracted non-weak texture regions based on the two-dimension loss image;

increasing a ratio of the second similarity, and obtaining a second loss value; and further adjusting the parameters of the depth estimation model based on the second loss value.

11. The electronic device of claim 10, wherein the step of increasing a ratio of the second similarity, and obtaining a second loss value comprises:

acquiring an enlarged scale of the second similarity; and adjusting the second similarity based on the enlarged scale, and obtaining the second loss value.

12. The electronic device of claim 9, wherein the steps of decreasing a ratio of the first similarity, and obtaining a first loss value comprises:

acquiring a reduced scale of the first similarity; and adjusting the first similarity based on the reduced scale, and obtaining the first loss value.

13. The electronic device of claim 9, wherein the steps of extracting weak texture regions in the first image comprises:

acquiring information of color and brightness of the first image;

dividing the first image into regions based on the information of color and brightness;

calculating gradient information of the first image; and selecting the regions based on the gradient information, wherein a gradient average value of the regions is in a predetermined range, as the weak texture regions.

14. The electronic device of claim 9, wherein the step of extracting non-weak texture regions in the first image comprises:

acquiring information of color and brightness of the first image;

dividing the first image into regions based on the information of color and brightness;

calculating gradient information of the first image; and selecting the regions based on the gradient information, wherein a gradient average value of the regions is outside a predetermined range, as the non-weak-texture regions.

* * * * *